(12) United States Patent
Nakanishi

(10) Patent No.: US 11,619,215 B2
(45) Date of Patent: Apr. 4, 2023

(54) CRYOPUMP AND CRYOCOOLER VIBRATION ISOLATION STRUCTURE

(71) Applicant: SUMITOMO HEAVY INDUSTRIES, LTD., Tokyo (JP)

(72) Inventor: Takahiro Nakanishi, Tokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 7 days.

(21) Appl. No.: 17/491,914

(22) Filed: Oct. 1, 2021

(65) Prior Publication Data
US 2022/0018342 A1 Jan. 20, 2022

Related U.S. Application Data

(63) Continuation of application No. PCT/JP2020/007668, filed on Feb. 26, 2020.

(30) Foreign Application Priority Data

Apr. 2, 2019 (JP) .............................. JP2019-070799

(51) Int. Cl.
  *F04B 37/08* (2006.01)
  *F16F 15/04* (2006.01)
  *F04B 53/00* (2006.01)

(52) U.S. Cl.
  CPC .............. *F04B 37/08* (2013.01); *F04B 53/00* (2013.01); *F16F 15/04* (2013.01)

(58) Field of Classification Search
  CPC ............ F04B 37/08; F04B 53/00; F16F 15/04
  See application file for complete search history.

(56) References Cited

U.S. PATENT DOCUMENTS

| | | | | | |
|---|---|---|---|---|---|
| 4,363,217 A | * | 12/1982 | Venuti | ..................... | F04B 37/08 62/55.5 |
| 4,835,972 A | * | 6/1989 | Tugal | ..................... | F04B 37/08 181/207 |
| 4,862,697 A | * | 9/1989 | Tugal | ..................... | F04B 37/08 62/55.5 |

(Continued)

FOREIGN PATENT DOCUMENTS

| | | |
|---|---|---|
| JP | S58-183878 A | 10/1983 |
| JP | S63-501519 A | 6/1988 |

(Continued)

*Primary Examiner* — Lionel Nouketcha
(74) *Attorney, Agent, or Firm* — Michael Best & Friedrich LLP

(57) ABSTRACT

Provided is a cryopump including a cryopump vacuum chamber, a cryocooler, a first flange fixed to the cryopump vacuum chamber, a second flange fixed to the cryocooler and airtightly connected to the first flange, and an annular laminated vibration isolation body in which a first annular vibration isolation material, a first annular support member, an intermediate annular vibration isolation material, a second annular support member, and a second annular vibration isolation material are disposed in this order from the first flange toward the second flange. The second annular support member and the first annular support member are fixed to the first flange and the second flange, respectively, such that the first flange and the second annular support member are vibration-isolated from the second flange and the first annular support member.

20 Claims, 11 Drawing Sheets

(56) References Cited

U.S. PATENT DOCUMENTS 5,056,319 A * 10/1991 Strasser .................. F04B 37/08
                                                                         62/55.5
5,490,356 A     2/1996   Kememy

FOREIGN PATENT DOCUMENTS

| JP | H03-046234 A | 2/1991 |
| JP | H04-001348 A | 1/1992 |
| JP | H09-506400 A | 6/1997 |
| JP | 2004-225722 A | 8/2004 |
| JP | 2006-068014 A | 3/2006 |
| JP | 2017-193993 A | 10/2017 |
| WO | 95/14830 A1 | 6/1995 |

* cited by examiner

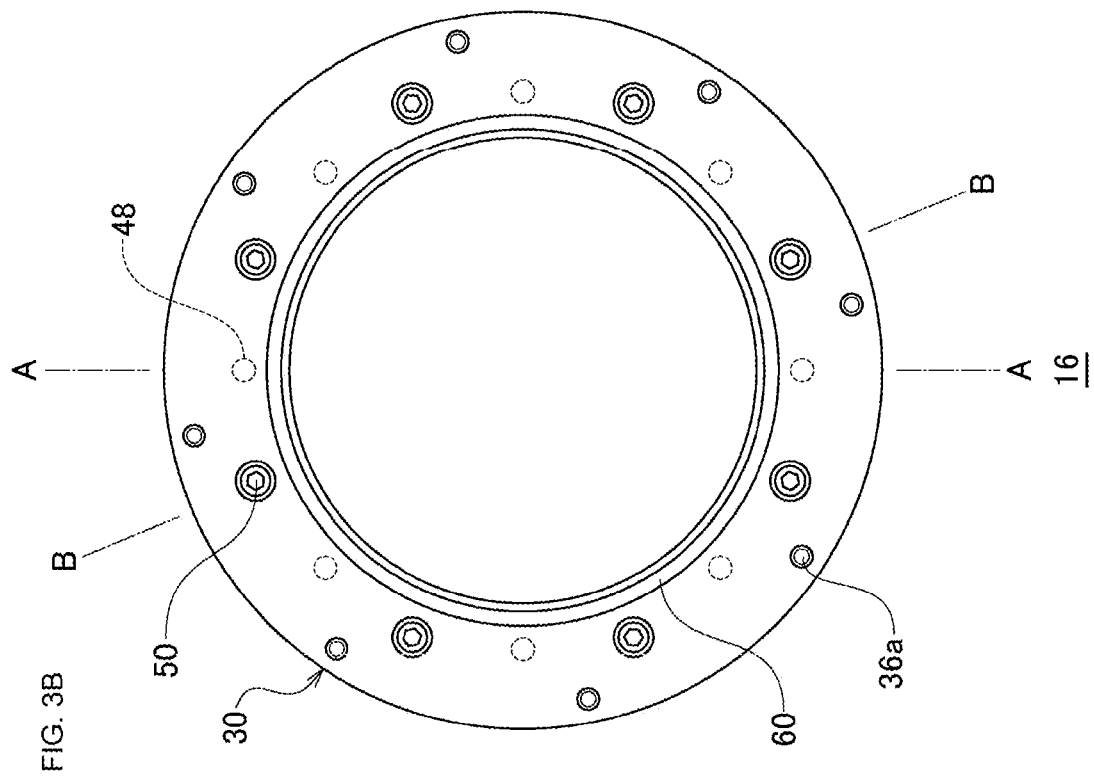
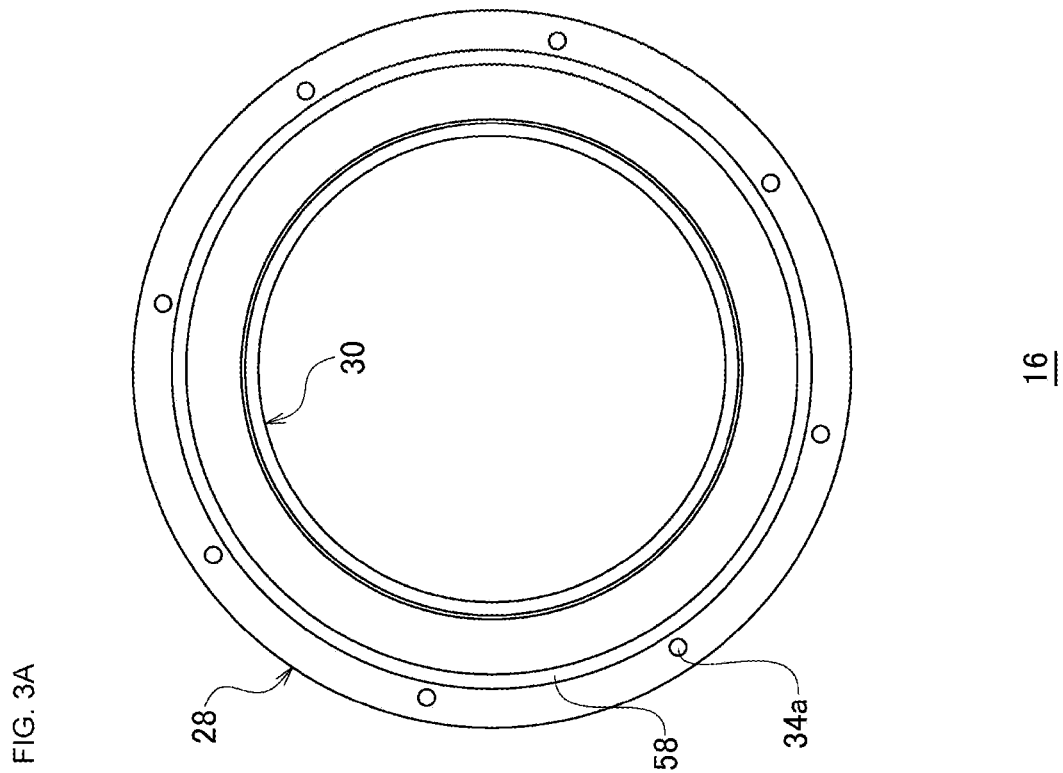

40

44

CRYOPUMP AND CRYOCOOLER VIBRATION ISOLATION STRUCTURE

RELATED APPLICATIONS

The contents of Japanese Patent Application No. 2019-070799, and of International Patent Application No. PCT/JP2020/007668, on the basis of each of which priority benefits are claimed in an accompanying application data sheet, are in their entirety incorporated herein by reference.

BACKGROUND

Technical Field

Certain embodiments of the present invention relate to a cryopump and a cryocooler vibration isolation structure.

Description of Related Art

A cryopump is a vacuum pump that captures and exhausts gas molecules by condensing or adsorbing the gas molecules in a cryopanel cooled to a cryogenic temperature. For example, the cryopump provides a vacuum environment by being installed in a vacuum process device that performs a vacuum process such as a semiconductor circuit manufacturing process.

SUMMARY

According to an embodiment of the present invention, there is provided a cryopump including a cryopump vacuum chamber, a cryocooler, a first flange fixed to the cryopump vacuum chamber, a second flange fixed to the cryocooler and airtightly connected to the first flange, and an annular laminated vibration isolation body in which a first annular vibration isolation material, a first annular support member, an intermediate annular vibration isolation material, a second annular support member, and a second annular vibration isolation material are disposed in this order from the first flange toward the second flange. The second annular support member and the first annular support member are fixed to the first flange and the second flange, respectively, such that the first flange and the second annular support member are vibration-isolated from the second flange and the first annular support member.

According to another embodiment of the present invention, there is provided a cryocooler vibration isolation structure including a first flange, a second flange airtightly connected to the first flange, and an annular laminated vibration isolation body in which a first annular vibration isolation material, a first annular support member, an intermediate annular vibration isolation material, a second annular support member, and a second annular vibration isolation material are disposed in this order from the first flange toward the second flange. The second annular support member and the first annular support member are fixed to the first flange and the second flange, respectively, such that the first flange and the second annular support member are vibration-isolated from the second flange and the first annular support member.

According to still another embodiment of the present invention, there is provided a cryocooler vibration isolation structure including a first flange, a second flange airtightly connected to the first flange, a laminated vibration isolation body in which a first vibration isolation material, a first support member, an intermediate vibration isolation material, a second support member, and a second vibration isolation material are disposed in this order from the first flange toward the second flange, a first fixing member that fixes the second support member to the first flange, the first fixing member forming a first support structure for supporting the first vibration isolation material and the intermediate vibration isolation material, together with the first flange and the second support member, and a second fixing member that fixes the first support member to the second flange, the second fixing member forming a second support structure for supporting the intermediate vibration isolation material and the second vibration isolation material, together with the second flange and the first support member. The first support structure and the second support structure are vibration-isolated from each other by the first vibration isolation material, the intermediate vibration isolation material, and the second vibration isolation material.

BRIEF DESCRIPTION OF THE DRAWINGS

FIG. 3A is a schematic plan view when the vibration isolation structure according to the embodiment is viewed from a first flange side, and FIG. 3B is a schematic plan view when the vibration isolation structure according to the embodiment is viewed from a second flange side.

DETAILED DESCRIPTION

Figure 1:
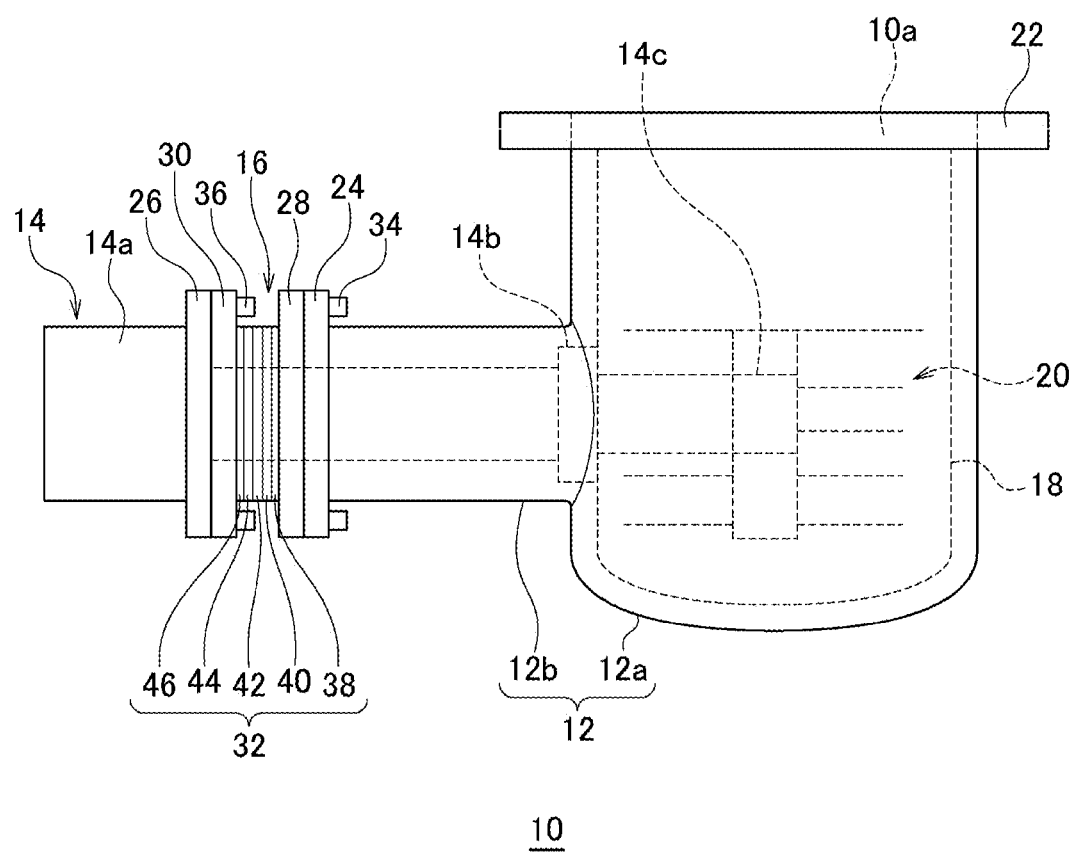
FIG. 1 is a view schematically illustrating a cryopump according to an embodiment.

A cryopump includes a cryocooler to cool a cryopanel. The cryocooler is configured to cause an internal pressure of a refrigerant gas to periodically fluctuate, and pressure fluctuations generated in this way may cause the cryocooler to vibrate. In addition, when a movable member such as a displacer and a drive source thereof are incorporated as in a Gifford-McMahon (GM) cryocooler, the movable member and the drive source may also cause the cryocooler to vibrate. The vibrations generated from the cryocooler may be transmitted to a vacuum process device via the cryopump. The vibrations may be one factor that can affect quality of a vacuum process.

It is desirable to reduce the vibrations transmitted from the cryocooler to other devices.

Any desired combination of the above-described components, and those in which the components or expressions according to the present invention are substituted from each other in methods, devices, or systems are effectively applicable as an aspect of the present invention.

According to the present invention, it is possible to reduce vibrations transmitted from the cryocooler to other devices.

Hereinafter, embodiments according to the present invention will be described in detail with reference to the drawings. The same reference numerals will be assigned to the same or equivalent components, members, and processes in the description and the drawings, and repeated description will be appropriately omitted. A scale or a shape of each illustrated element is set for convenience in order to facilitate the description, and is not to be interpreted in a limited manner unless otherwise specified. The embodiments are merely examples, and do not limit the scope of the present invention at all. All features or combinations thereof which are described in the embodiments are not necessarily essential to the invention.

FIG. 1 is a view schematically illustrating a cryopump 10 according to an embodiment. For example, the cryopump 10 is attached to a vacuum chamber of an ion implanter, a sputtering device, a vapor deposition device, or other vacuum process devices, and is used to raise a vacuum degree inside the vacuum chamber to a level required for a desired vacuum process.

The cryopump 10 includes a cryopump vacuum chamber 12, a cryocooler 14, a vibration isolation structure 16, a first stage cryopanel 18, and a second stage cryopanel 20.

Although details will be described later, the cryocooler 14 is mounted to the cryopump vacuum chamber 12 via the vibration isolation structure 16. In this manner, the cryopump vacuum chamber 12 is vibration-isolated from the cryocooler 14.

The cryopump vacuum chamber 12 includes a vacuum chamber main body 12a having an intake port flange 22, and a cryocooler accommodating cylinder 12b having a vacuum chamber flange 24. The vacuum chamber main body 12a is a cylinder (for example, a circular cylinder) in which one end is open as a cryopump intake port 10a and the other end is closed, and the intake port flange 22 is provided in the vacuum chamber main body 12a to surround the cryopump intake port 10a. Usually, the intake port flange 22 is mounted on a gate valve. A gas in the vacuum chamber of the vacuum process device enters the cryopump 10 through the gate valve and the cryopump intake port 10a. The illustrated cryopump 10 is a so-called horizontal cryopump. Accordingly, the cryocooler accommodating cylinder 12b is a cylinder (for example, a circular cylinder) in which both ends are open. One end is joined to a cryocooler insertion hole formed on a side surface of the vacuum chamber main body 12a, and the vacuum chamber flange 24 is provided in the other end.

The cryopump 10 may be of a so-called vertical type. In this case, the vacuum chamber main body 12a has the cryocooler insertion hole on a bottom surface instead of the side surface, and the cryocooler accommodating cylinder 12b is joined to the cryocooler insertion hole on the bottom surface of the vacuum chamber main body 12a.

The cryocooler 14 includes a room temperature portion 14a, a first cooling stage 14b, and a second cooling stage 14c, and is inserted into the vacuum chamber main body 12a through the vibration isolation structure 16 and the cryocooler accommodating cylinder 12b. The room temperature portion 14a is located outside the cryopump vacuum chamber 12. On the other hand, the first cooling stage 14b and the second cooling stage 14c are located inside the cryopump vacuum chamber 12. For example, the first cooling stage 14b is located in an internal space of the cryocooler accommodating cylinder 12b, and the second cooling stage 14c is located in an internal space of the vacuum chamber main body 12a. The first cooling stage 14b may be located near a joint portion between the cryocooler accommodating cylinder 12b and the vacuum chamber main body 12a. As an example, the cryocooler 14 is a two-stage GM cryocooler, but may be another cryocooler such as a pulse tube cryocooler.

The first stage cryopanel 18 is thermally coupled to the first cooling stage 14b and is disposed inside the vacuum chamber main body 12a. The first stage cryopanel 18 is structurally supported by the first cooling stage 14b to be in non-contact with the cryopump vacuum chamber 12. The first stage cryopanel 18 is also referred to as a radiation shield. In many cases, the first stage cryopanel 18 has a cylindrical shape having a diameter slightly smaller than that of the vacuum chamber main body 12a. The first stage cryopanel 18 may have a plate-shaped (for example, disk-shaped) or louver-shaped intake port cryopanel thermally coupled to the radiation shield and disposed in or near the cryopump intake port 10a.

The second stage cryopanel 20 is thermally coupled to the second cooling stage 14c, and is disposed inside the vacuum chamber main body 12a. The second stage cryopanel 20 is structurally supported by the second cooling stage 14c to be in non-contact with the first stage cryopanel 18. The second cooling stage 14c and the second stage cryopanel 20 are surrounded by the first stage cryopanel 18.

Dispositions or shapes of the first stage cryopanel 18 and the second stage cryopanel 20 are not limited to those specifically illustrated, and various known configurations can be appropriately adopted.

The first stage cryopanel 18 is cooled to a first cooling temperature by the first cooling stage 14b, and the second stage cryopanel 20 is cooled to a second cooling temperature by the second cooling stage 14c. The second cooling temperature is lower than the first cooling temperature. For example, the first cooling temperature may be in a range of approximately 65 to 120 K, or approximately 80 to 100 K. The second cooling temperature may be in a range of approximately 10 to 20K.

Therefore, for example, in the first stage cryopanel 18, a gas (also referred to as a type 1 gas) whose vapor pressure is sufficiently low (for example, $10^{-8}$ Pa or lower) at the first cooling temperature such as water vapor is condensed. In the second stage cryopanel 20, a gas (also referred to as a type 2 gas) whose vapor pressure is sufficiently low at the second cooling temperature such as argon, nitrogen, and oxygen is condensed. The second stage cryopanel 20 may be provided with an adsorbent such as activated carbon. In that case, the adsorbent adsorbs a gas (also referred to as a type 3 gas) whose vapor pressure is not sufficiently low even at the second cooling temperature such as hydrogen. In this way, the cryopump 10 can provide a desired vacuum environment by exhausting various gases through condensing or adsorbing.

The room temperature portion 14a of the cryocooler 14 has a cryocooler flange 26. In a typical cryopump, the cryocooler flange 26 is fastened to the vacuum chamber flange 24. In this manner, the cryocooler 14 can be attached to the cryopump vacuum chamber 12. However, in the cryopump 10 according to the present embodiment, the vibration isolation structure 16 connects the cryocooler flange 26 to the vacuum chamber flange 24. The cryocooler 14 is mounted on the cryopump vacuum chamber 12 via the vibration isolation structure 16. Therefore, the cryocooler 14 is not directly attached to the cryopump vacuum chamber 12.

The vibration isolation structure 16 includes a first flange 28, a second flange 30, and an annular laminated vibration isolation body 32 disposed between the first flange 28 and the second flange 30. The annular laminated vibration isolation body 32 includes a first annular vibration isolation material 38, a first annular support member 40, an intermediate annular vibration isolation material 42, a second annular support member 44, and a second annular vibration isolation material 46.

The first flange 28 is mounted on the vacuum chamber flange 24, and is fixed to the cryopump vacuum chamber 12. For example, the first flange 28 is fastened to the vacuum chamber flange 24 by a plurality of first fastening bolts 34. The second flange 30 is mounted on the cryocooler flange 26, and is fixed to the room temperature portion 14a of the cryocooler 14. For example, the second flange 30 is fastened to the cryocooler flange 26 by a plurality of second fastening bolts 36.

In the illustrated example, both the vacuum chamber flange 24 and the cryocooler flange 26 have an annular shape. Accordingly, the vibration isolation structure 16 also has the annular shape. However, for example, when the flange on which the vibration isolation structure 16 is mounted has other shapes such as a rectangular shape, the vibration isolation structure 16 may also have other shapes such as a square cylinder shape.

Figure 2:
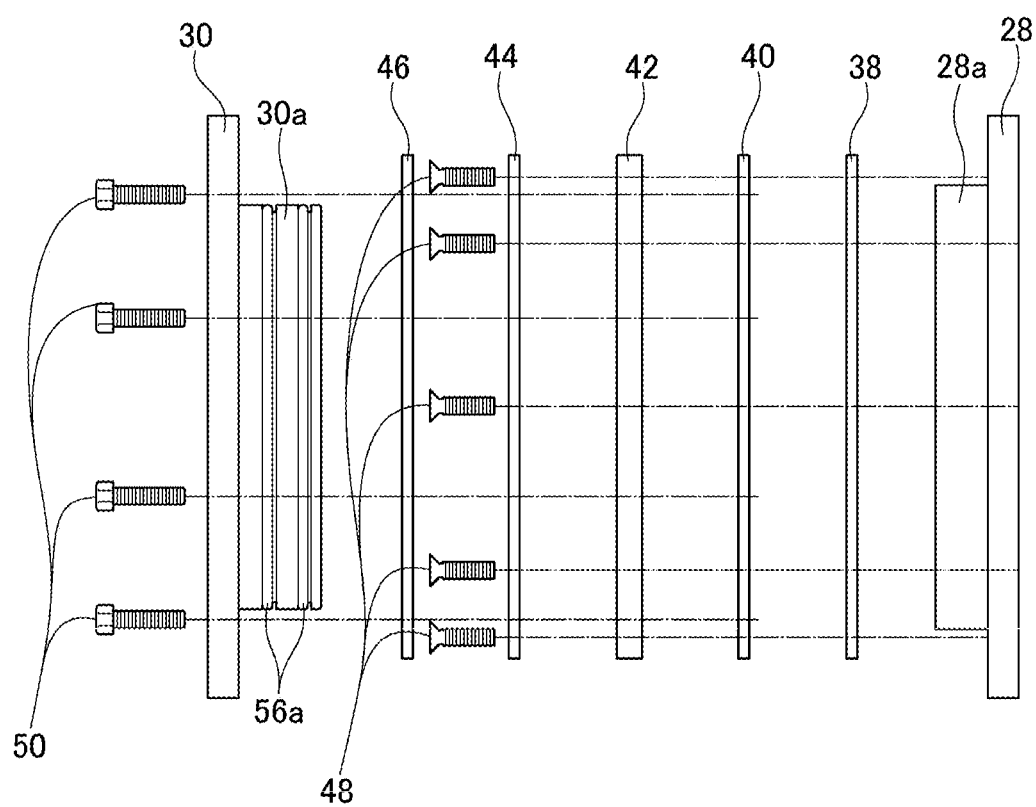
FIG. 2 is an exploded view schematically illustrating a vibration isolation structure according to an embodiment.
Figure 4A:
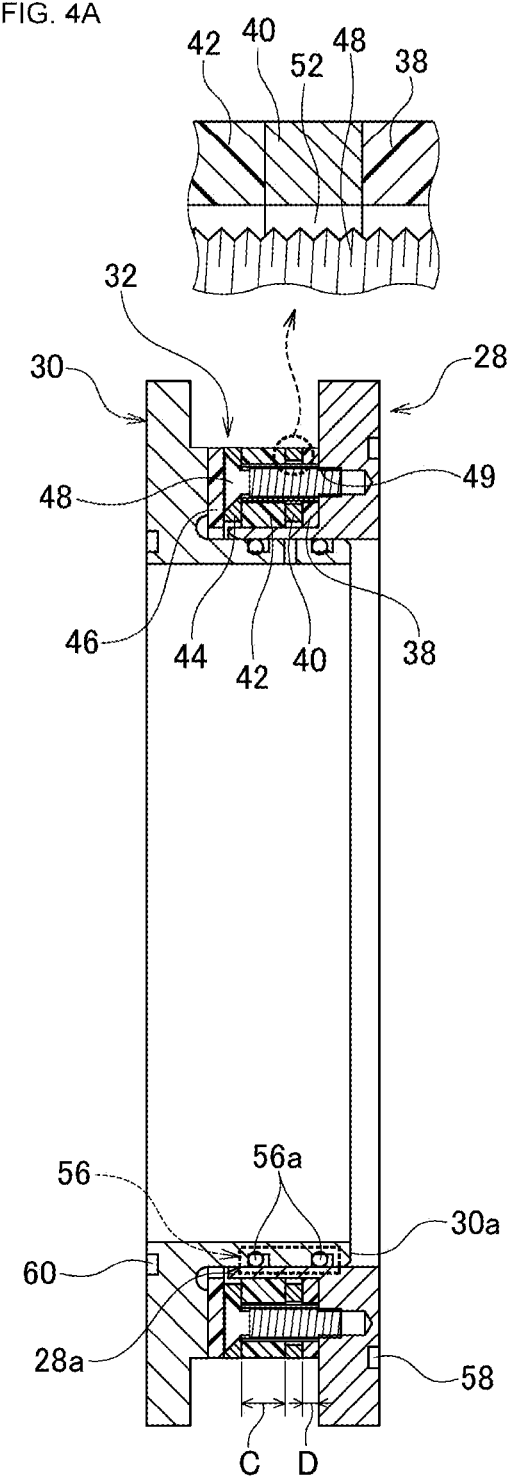
FIG. 4A schematically illustrates a cross section taken along line A-A in FIG. 3B, and FIG. 4B schematically illustrates a cross section taken along line B-B in FIG. 3B.
Figure 4B:
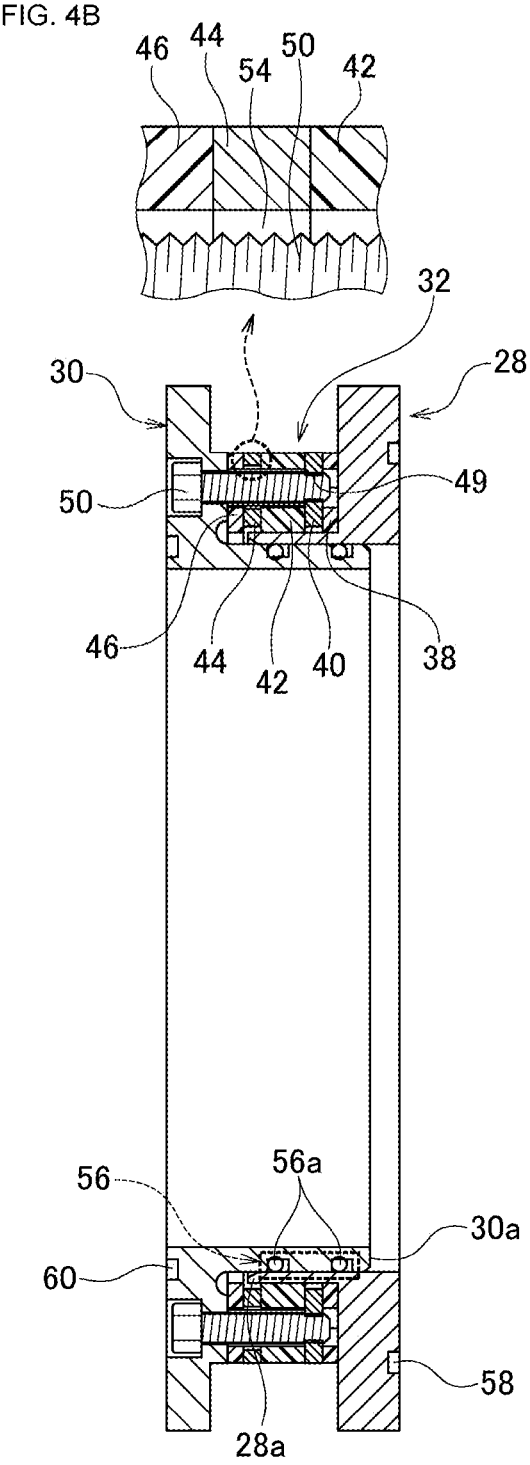
Figure 5A:
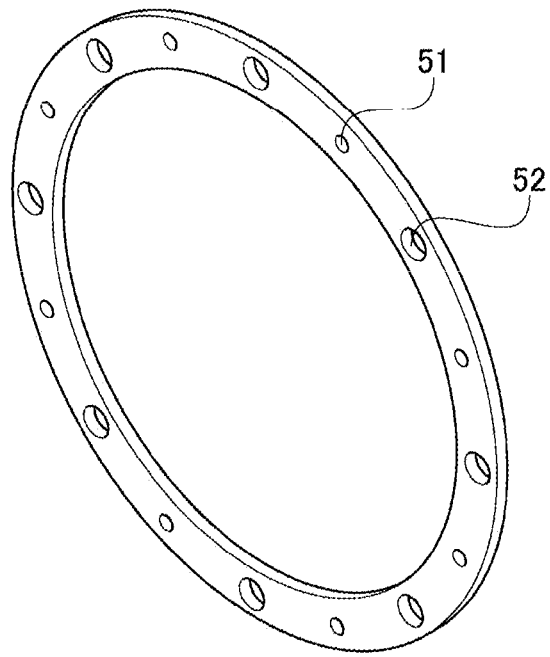
FIG. 5A is a schematic perspective view of a first annular support member according to the embodiment.
Figure 5B:
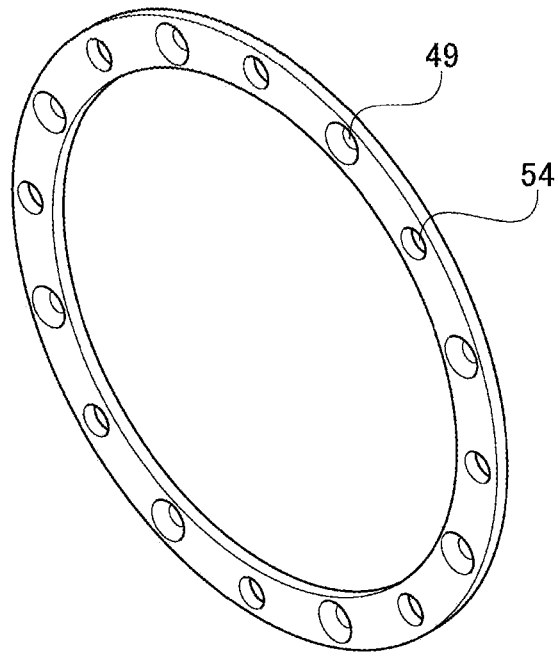
FIG. 5B is a schematic perspective view of a second annular support member according to the embodiment.

FIG. 2 is an exploded view schematically illustrating the vibration isolation structure 16 according to the embodiment. FIG. 3A is a schematic plan view when the vibration isolation structure 16 according to the embodiment is viewed from the first flange 28 side, and FIG. 3B is a schematic plan view when the vibration isolation structure 16 according to the embodiment is viewed from the second flange 30 side. FIG. 4A schematically illustrates a cross section taken along line A-A in FIG. 3B, and FIG. 4B schematically illustrates a cross section taken along line B-B in FIG. 3B. In addition, FIG. 5A is a schematic perspective view of the first annular support member 40 according to the embodiment, and FIG. 5B is a schematic perspective view of the second annular support member 44 according to the embodiment.

From the first flange 28 toward the second flange 30, the first annular vibration isolation material 38, the first annular support member 40, the intermediate annular vibration isolation material 42, the second annular support member 44, and the second annular vibration isolation material 46 are disposed in this order, thereby configuring the annular laminated vibration isolation body 32.

The components of the annular laminated vibration isolation body 32 each have a ring shape, and are coaxially disposed adjacent to each other along a center axis direction of the annular laminated vibration isolation body 32. The ring shape of each component may have a common inner diameter and a common outer diameter. The outer diameter of the vibration isolation structure 16 is determined by the outer diameter of the first flange 28 and the second flange 30. However, the outer diameter of the annular laminated vibration isolation body 32 is smaller than that of the vibration isolation structure 16, and the annular laminated vibration isolation body 32 is accommodated in a space pinched between the first flange 28 and the second flange 30.

As in the first flange 28 and the second flange 30, the first annular support member 40 and the second annular support member 44 are formed of a metal material such as stainless steel or other suitable structural materials, for example. The first annular vibration isolation material 38, the intermediate annular vibration isolation material 42, and the second annular vibration isolation material 46 are formed of rubber, for example. Alternatively, the first annular vibration isolation material 38, the intermediate annular vibration isolation material 42, and the second annular vibration isolation material 46 may be formed of a synthetic resin such as gel or fluororesin, a soft metal such as aluminum, or other vibration isolation materials. The first annular vibration isolation material 38, the intermediate annular vibration isolation material 42, and the second annular vibration isolation material 46 may be formed of the same material, or may be formed of different materials.

Vibration isolation characteristics (for example, a relationship between a vibration frequency and vibration transmissibility) of the vibration isolation structure 16 may be adjusted by selecting a material of the annular vibration isolation materials (38, 42, and 46). The vibration isolation characteristics of the vibration isolation structure 16 may be adjusted by selecting a dimension of the annular vibration isolation material (for example, a thickness of the annular laminated vibration isolation body 32 in the center axis direction or a contact area with the adjacent annular support member). In addition, the vibration isolation characteristics of the vibration isolation structure 16 may be adjusted by selecting the dimensions and/or the materials of the annular support members (40 and 44).

In the vibration isolation structure 16 according to the embodiment, the second annular support member 44 is fixed to the first flange 28, and the first annular support member 40 is fixed to the second flange 30 so that the first flange 28 and the second annular support member 44 are vibration-isolated from the second flange 30 and the first annular support member 40. The vibration isolation structure 16 includes a first fastening member 48 and a second fastening member 50 in order to fix the first flange 28, the second flange 30, and the annular laminated vibration isolation body 32 to each other.

The first fastening member 48 fixes the second annular support member 44 to the first flange 28 to sandwich the first annular vibration isolation material 38, the first annular support member 40, and the intermediate annular vibration isolation material 42 between the first flange 28 and the second annular support member 44.

The vibration isolation structure 16 has a first fastening hole 49 that reaches the first flange 28 by penetrating the second annular support member 44, the intermediate annular vibration isolation material 42, the first annular support member 40, and the first annular vibration isolation material 38. The first fastening member 48 is inserted into the first fastening hole 49, and the second annular support member 44 is fastened to the first flange 28 by the first fastening member 48. A fastening force generated by the first fastening member 48 acts on the first annular vibration isolation material 38, the first annular support member 40, and the intermediate annular vibration isolation material 42 which are pinched between the first flange 28 and the second annular support member 44.

In the illustrated example, the first fastening member 48 is a countersunk bolt. The first fastening hole 49 is a countersunk hole in the second annular support member 44. A head portion of the first fastening member 48 is accommodated in the second annular support member 44. In addition, the first fastening hole 49 is a bolt hole in the first flange 28. In this manner, the first fastening member 48 fastens the second annular support member 44 to the first flange 28. The first fastening hole 49 does not penetrate the first flange 28. The first fastening member 48 and the first fastening hole 49 are provided at a plurality of locations (for example, eight locations) at an equal angular interval in a circumferential direction.

The first fastening member 48 is disposed in non-contact with the first annular support member 40. The first annular support member 40 has a first insertion hole 52 having a diameter larger than that of the first fastening member 48. The first insertion hole 52 is a so-called unloaded hole formed in the first annular support member 40, and is a portion of the first fastening hole 49. The first fastening member 48 is inserted into the first insertion hole 52 with some play from the first annular support member 40. Therefore, a vibration transmission channel is not formed between the first fastening member 48 and the first annular support member 40. As in the first insertion hole 52 of the first annular support member 40, an insertion hole into which the first fastening member 48 is inserted is also formed in the first annular vibration isolation material 38 and the intermediate annular vibration isolation material 42. For example, the insertion holes are circular through-holes, but may be through-holes having other shapes such as a rectangular shape.

In addition, the first fastening member 48 is disposed in non-contact with the second flange 30. The head portion of the first fastening member 48 is supported by the second annular support member 44, and the second annular vibration isolation material 46 is inserted between the second flange 30 and the second annular support member 44. Accordingly, the first fastening member 48 does not come into contact with the second flange 30.

The second fastening member 50 fixes the first annular support member 40 to the second flange 30 to sandwich the intermediate annular vibration isolation material 42, the second annular support member 44, and the second annular vibration isolation material 46 between the second flange 30 and the first annular support member 40.

The vibration isolation structure 16 has a second fastening hole 51 that reaches the first annular support member 40 by penetrating the second flange 30, the second annular vibration isolation material 46, the second annular support member 44, and the intermediate annular vibration isolation material 42. The second fastening member 50 is inserted into the second fastening hole 51, and the second flange 30 is fastened to the first annular support member 40 by the second fastening member 50. A fastening force generated by the second fastening member 50 acts on the intermediate annular vibration isolation material 42, the second annular support member 44, and the second annular vibration isolation material 46 which are pinched between the second flange 30 and the first annular support member 40.

In the illustrated example, the second fastening member 50 is a bolt. The second fastening hole 51 is a deep countersunk hole in the second flange 30. A head portion of the second fastening member 50 is accommodated in the second flange 30. In addition, the second fastening hole 51 is a bolt hole in the first annular support member 40. In this manner, the second fastening member 50 fastens the second flange 30 to the first annular support member 40. The second fastening hole 51 penetrates the first annular support member 40. The second fastening member 50 and the second fastening hole 51 are provided at a plurality of locations (for example, eight locations) at an equal angular interval in the circumferential direction.

The second fastening member 50 is disposed in non-contact with the second annular support member 44. The second annular support member 44 has a second insertion hole 54 having a diameter larger than that of the second fastening member 50. The second insertion hole 54 is a so-called unloaded hole formed in the second annular support member 44, and is a portion of the second fastening hole 51. The second fastening member 50 is inserted into the second insertion hole 54 with some play from the second annular support member 44. Therefore, a vibration transmission channel is not formed between the second fastening member 50 and the second annular support member 44. As in the second insertion hole 54 of the second annular support member 44, an insertion hole into which the second fastening member 50 is inserted is also formed in the intermediate annular vibration isolation material 42 and the second annular vibration isolation material 46. For example, the insertion holes are circular through-holes, but may be through-holes having other shapes such as a rectangular shape.

In addition, the second fastening member 50 is disposed in non-contact with the first flange 28. The first annular vibration isolation material 38 is inserted between the first flange 28 and the first annular support member 40. Accordingly, a tip part of the second fastening member 50 does not reach the first flange 28.

A stronger axial compressive force acts on the intermediate annular vibration isolation material 42 than on the first annular vibration isolation material 38. The reason is as follows. The first annular vibration isolation material 38 is only compressed by the fastening force of the first fastening member 48. In contrast, the intermediate annular vibration isolation material 42 is compressed by both the fastening forces of the first fastening member 48 and the second fastening member 50.

Therefore, the intermediate annular vibration isolation material 42 is thicker than the first annular vibration isolation material 38 in the center axis direction of the annular laminated vibration isolation body 32. In this manner, intensity of the intermediate annular vibration isolation material 42 can be increased. For example, a thickness C of the intermediate annular vibration isolation material 42 may be approximately 1.5 to 3 times, for example, approximately twice a thickness D of the first annular vibration isolation material 38. The intermediate annular vibration isolation material 42 may be formed of a single material layer having the thickness C. Alternatively, the intermediate annular vibration isolation material 42 may be configured so that a plurality of (for example, two) material layers are laminated (for example, two material layers the same as the material layer used as the first annular vibration isolation material 38 may be laminated). Similarly, the stronger axial compressive force acts on the intermediate annular vibration isolation material 42 than on the second annular vibration isolation material 46. Accordingly, the intermediate annular vibration isolation material 42 is thicker than the second annular vibration isolation material 46 in the center axis direction of the annular laminated vibration isolation body 32.

Instead of the circular through-hole, the insertion hole of the annular vibration isolation material may be a cutout portion (for example, having a U-shape in a plan view) connected to an outer periphery (or inner periphery) of the annular vibration isolation material. The annular vibration isolation material is formed of a soft material such as rubber.

Accordingly, compared to the through-hole, the cutout portion is more easily processed. Similarly, the insertion hole of the annular support member may also be a cutout portion connected to an outer periphery (or an inner periphery) of the annular support member.

The first fastening member 48 and the second fastening member 50 (that is, the first fastening hole 49 and the second fastening hole 51) are disposed at the same position in the radial direction of the annular laminated vibration isolation body 32 and at different positions in the circumferential direction. However, for example, since the first fastening member 48 and the second fastening member 50 are disposed at different positions in a radial direction, the first fastening member 48 and the second fastening member 50 can also be disposed at the same position in the circumferential direction of the annular laminated vibration isolation body 32.

The second flange 30 is airtightly connected to the first flange 28. A vacuum seal portion 56 is formed between the first flange 28 and the second flange 30. The first flange 28 has a first flange cylinder portion 28a extending from an opening portion thereof toward the second flange 30, and the second flange 30 has a second flange cylinder portion 30a extending from an opening portion thereof toward the first flange 28.

An outer diameter of the second flange cylinder portion 30a is slightly smaller than an inner diameter of the first flange cylinder portion 28a, and the second flange cylinder portion 30a is inserted into the first flange cylinder portion 28a. For example, a seal member 56a such as an O-ring is disposed between an inner peripheral surface of the first flange cylinder portion 28a and an outer peripheral surface of the second flange cylinder portion 30a, thereby forming the vacuum seal portion 56. The seal member 56a is mounted on the outer peripheral surface of the second flange cylinder portion 30a.

In the vacuum seal portion 56, a dimensional tolerance of the first flange cylinder portion 28a and the second flange cylinder portion 30a is set so that both of these come into contact with each other only via the seal member 56a. Accordingly, for example, a gap of approximately 0.05 to 0.3 mm, for example, a gap of approximately 0.1 mm is formed between the inner peripheral surface of the first flange cylinder portion 28a and the outer peripheral surface of the second flange cylinder portion 30a. The first flange 28 and the second flange 30 are not in contact with each other.

A positional relationship between the first flange cylinder portion 28a and the second flange cylinder portion 30a in the radial direction can be reversed. The first flange cylinder portion 28a may be inserted into the second flange cylinder portion 30a, and the vacuum seal portion 56 may be formed between the outer peripheral surface of the first flange cylinder portion 28a and the inner peripheral surface of the second flange cylinder portion 30a.

The first flange 28 is a vacuum flange that is airtightly connected to the vacuum chamber flange 24, and a first ring groove 58 for accommodating the seal member such as an O-ring is formed on a flange end surface. The first ring groove 58 is located inside a first bolt hole 34a for the first fastening bolt 34 in the radial direction, and is located outside the first fastening member 48 in the radial direction. In addition, the second flange 30 is a vacuum flange that is airtightly connected to the cryocooler flange 26, and a second ring groove 60 for accommodating the seal member such as an O-ring is formed on a flange end surface. The second ring groove 60 is located inside the second fastening member 50 in the radial direction. A second bolt hole 36a for the second fastening bolt 36 is formed outside the second fastening member 50 in the radial direction.

The annular laminated vibration isolation body 32 is disposed outside the vacuum seal portion 56 in the radial direction. The annular laminated vibration isolation body 32 is disposed outside a vacuum environment to surround the first flange cylinder portion 28a and the second flange cylinder portion 30a. That is, the annular laminated vibration isolation body 32 is disposed in an ambient environment, as in the room temperature portion 14a of the cryocooler 14. In this manner, compared to a case where the annular laminated vibration isolation body 32 is disposed in the vacuum environment, it is easier to design smaller diameters of the vacuum seal portion 56 and the vacuum flange. In addition, it is easier to design the larger diameter of the annular laminated vibration isolation body 32. In this case, an area of the annular vibration isolation material is increased to reduce a spring constant of the vibration isolation structure 16, and vibration transmissibility of a high frequency can be easily reduced.

An example of an assembly procedure of the vibration isolation structure 16 will be described. First, the first flange 28 is placed so that the first flange cylinder portion 28a faces upward. The first annular vibration isolation material 38, the first annular support member 40, the intermediate annular vibration isolation material 42, and the second annular support member 44 are laminated in this order on the first flange 28. The members are laminated on the first flange 28 to align positions of the through-holes of the members with each other, thereby forming the first fastening hole 49. The first fastening member 48 is inserted into the first fastening hole 49, and the second annular support member 44 is fastened to the first flange 28.

Next, the second annular vibration isolation material 46 is laminated on the second annular support member 44, and furthermore, the second flange 30 is attached from above. In this case, the second flange cylinder portion 30a is inserted into the first flange cylinder portion 28a. In addition, the second fastening hole 51 is formed by aligning the positions of the through-holes of the members. The second fastening member 50 is inserted into the second fastening hole 51, and the second flange 30 is fastened to the first annular support member 40. In this way, the vibration isolation structure 16 is assembled.

In this way, the first annular support member 40 is pinched between the first annular vibration isolation material 38 and the intermediate annular vibration isolation material 42, and is disposed in non-contact with the first flange 28, the second annular support member 44, and the first fastening member 48. The second annular support member 44 is pinched between the second annular vibration isolation material 46 and the intermediate annular vibration isolation material 42, and is disposed in non-contact with the second flange 30, the first annular support member 40, and the second fastening member 50. In addition, as described above, the first flange 28 and the second flange 30 are not in direct contact with each other.

Therefore, the vibration isolation structure 16 includes a first support structure having the first flange 28, the second annular support member 44, and the first fastening member 48, and a second support structure having the second flange 30, the first annular support member 40, and the second fastening member 50. The first support structure and the second support structure are vibration-isolated from each other by the first annular vibration isolation material 38, the intermediate annular vibration isolation material 42, and the second annular vibration isolation material 46. The first support structure is fixed to the cryopump vacuum chamber 12, and the second support structure is fixed to the cryocooler 14.

In many cases of the existing cryopumps, the cryocooler is directly fixed to the cryopump vacuum chamber. The cryocooler may be a vibration source due to internal periodic pressure fluctuations and a movement of a movable member such as a displacer. The vibration of the cryocooler may be transmitted to the cryopump vacuum chamber, and may be further transmitted to the vacuum process device on which the cryopump is mounted.

In contrast, according to the cryopump 10 in the embodiment, the cryocooler 14 is mounted on the cryopump vacuum chamber 12 via the vibration isolation structure 16. The vibration isolation structure 16 includes the first flange 28 fixed to the cryopump vacuum chamber 12, the second flange 30 fixed to the cryocooler 14, and the annular laminated vibration isolation body 32 in which the first annular vibration isolation material 38, the first annular support member 40, the intermediate annular vibration isolation material 42, the second annular support member 44, and the second annular vibration isolation material 46 are disposed in this order from the first flange 28 toward the second flange 30. The second annular support member 44 is fixed to the first flange 28, and the first annular support member 40 is fixed to the second flange 30 so that the first flange 28 and the second annular support member 44 are vibration-isolated from the second flange 30 and the first annular support member 40.

In this manner, the cryopump vacuum chamber 12 is vibration-isolated from the cryocooler 14. Therefore, the vibrations transmitted from the cryocooler 14 to other devices can be reduced. Risks that the vibrations of the cryocooler 14 may affect the vacuum process device are reduced.

Figure 6A:
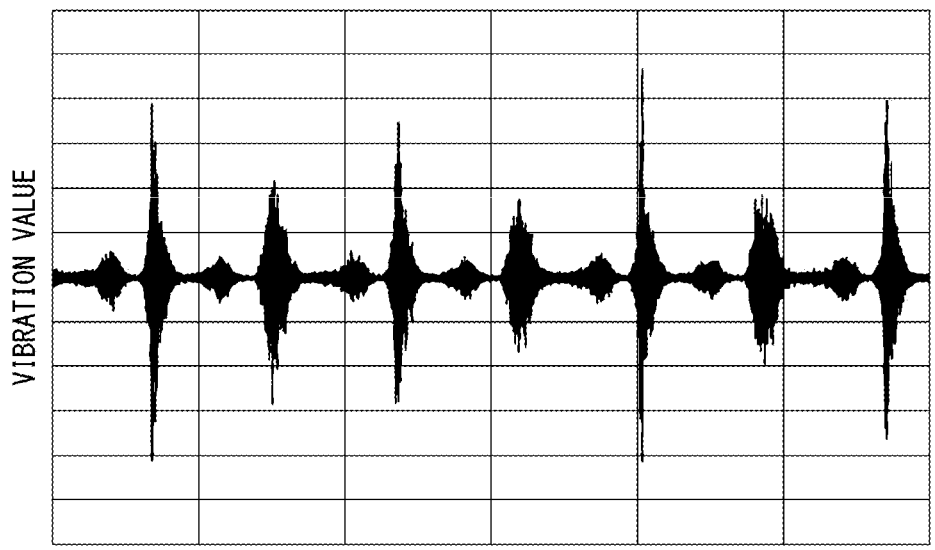
FIG. 6A illustrates a vibration measurement result of a cryopump according to a comparative example.
Figure 6B:
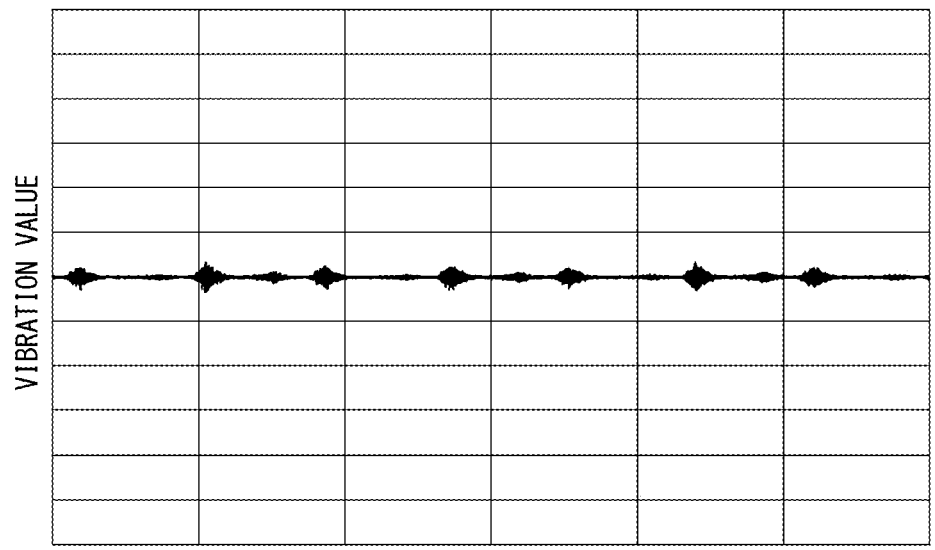
FIG. 6B illustrates a vibration measurement result of the cryopump according to the embodiment.

FIG. 6A illustrates a vibration measurement result of the cryopump according to a comparative example, and FIG. 6B illustrates a vibration measurement result of the cryopump 10 according to the embodiment. In the cryopump according to the comparative example, the cryocooler is directly fixed to the cryopump vacuum chamber. In the cryopump 10 according to the embodiment, the cryocooler 14 is mounted on the cryopump vacuum chamber 12 via the vibration isolation structure 16. The other measurement conditions are common to each other. The measurement results show the vibration of the cryopump vacuum chamber in a z-axis direction (upward-downward direction in FIG. 1). A vertical axis represents a value (for example, acceleration) indicating a magnitude of the vibration, and a horizontal axis represents a time.

As illustrated in FIG. 6A, when the cryocooler is directly fixed to the cryopump vacuum chamber, it can be recognized that the vibrations are repeatedly generated due to a periodic operation of the cryocooler. In contrast, as illustrated in FIG. 6B, when the cryopump 10 has the vibration isolation structure 16, the vibrations are greatly reduced. According to this measurement result, compared to the device in the related art illustrated in FIG. 6A, the maximum acceleration of the vibrations is reduced to approximately 7% (that is, reduction of approximately 93%). It is confirmed that the maximum acceleration in the x-axis direction and the y-axis direction is also reduced to approximately 12%, compared to the device in the related art.

In addition, the vibration isolation structure 16 according to the embodiment realizes structural support by using the flanges (28 and 30), the annular support members (40 and 44), and the fastening members (48 and 50). A weight of the cryocooler 14 is supported by the support structure. Accordingly, a load acting on the annular vibration isolation material can be reduced.

As the annular vibration isolation material, a ring-shaped material sheet can be adopted. In general, the vibration isolation material having this shape is easily available. It is not necessary to use a custom-made product having a special shape, and thus, it is advantageous in terms of design and manufacturing.

The vibration isolation structure 16 is mounted between the cryopump vacuum chamber 12 and the cryocooler 14. Accordingly, the vibration isolation structure 16 can be easily added between the cryopump vacuum chamber and the cryocooler of the existing cryopump. Vibration isolation performance can be improved without requiring any significant modification such as a design change in the cryopump or the cryocooler.

In the above-described embodiment, the vacuum seal portion 56 is provided inside the vibration isolation structure 16 in order to maintain the vacuum environment. The vacuum seal portion 56 is formed by a fitting structure (so-called spigot joint structure) between the first flange 28 and the second flange 30, and the seal member 56a mounted between the two flanges. However, it is also possible to use another structure that ensures airtightness of the vibration isolation structure 16. For example, the first flange 28 and the second flange 30 may be manufactured as an integral structure by bellows connection. In this case, the annular laminated vibration isolation body 32 installed between the first flange 28 and the second flange 30 may have a divided structure formed by combining a plurality of portions with each other. The embodiment will be described below with reference to FIGS. 7 to 10B.

Figure 7:
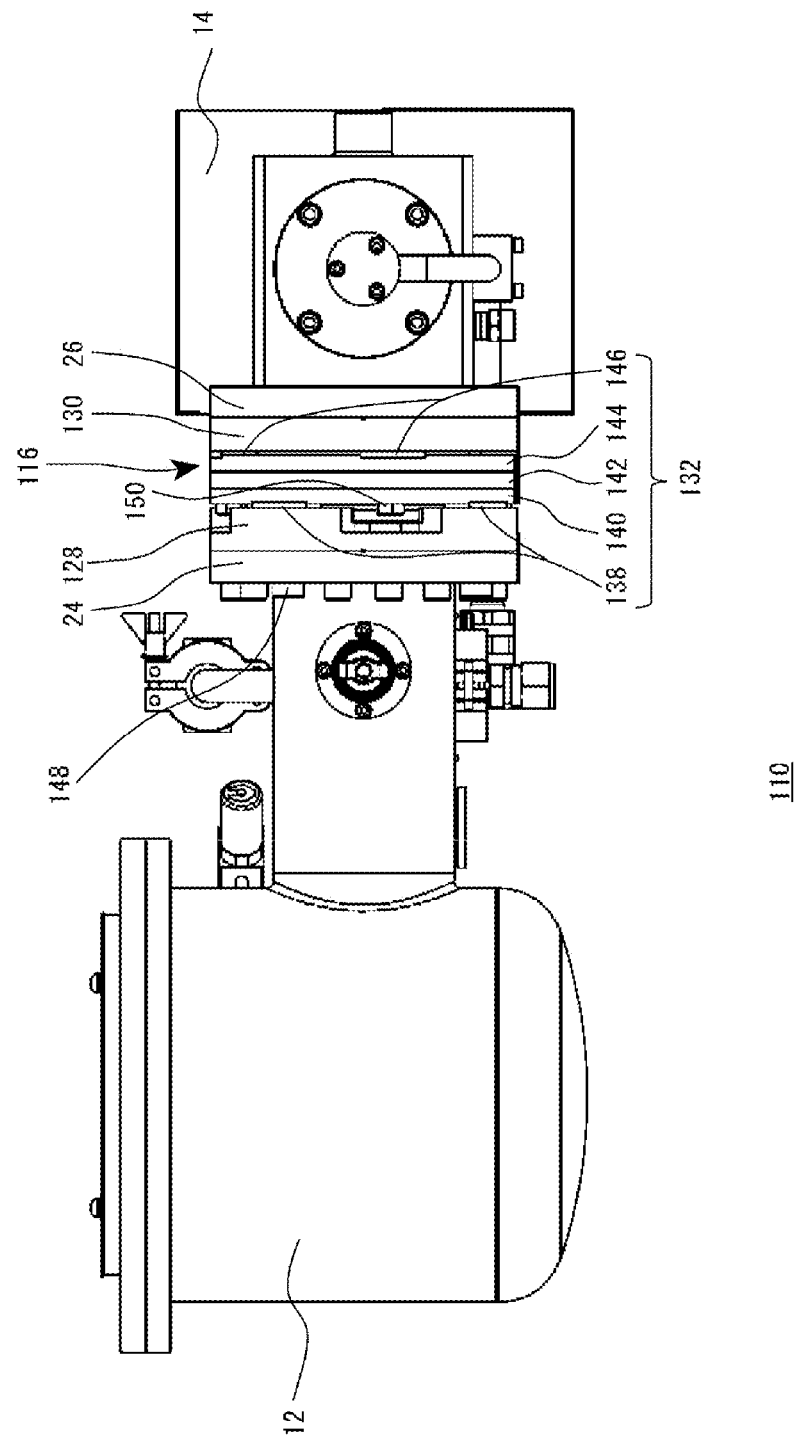
FIG. 7 is a view schematically illustrating a cryopump according to another embodiment.

FIG. 7 is a view schematically illustrating a cryopump 110 according to another embodiment. FIG. 7 illustrates a side surface of an appearance of the cryopump 110. The cryopump 110 includes the cryopump vacuum chamber 12, the cryocooler 14, and a vibration isolation structure 116. Internal structures of the cryopump vacuum chamber 12, the cryocooler 14, and the cryopump 110 may be the same as those described with reference to FIG. 1.

The cryocooler 14 is mounted on the cryopump vacuum chamber 12 via the vibration isolation structure 116. In this manner, the cryopump vacuum chamber 12 is vibration-isolated from the cryocooler 14. A first vibration isolation material 138, a first support member 140, an intermediate vibration isolation material 142, a second support member 144, and a second vibration isolation material 146 are disposed in this order from a first flange 128 toward a second flange 130, thereby configuring a laminated vibration isolation body 132. The first flange 128 is attached to the vacuum chamber flange 24, and the second flange 130 is attached to the cryocooler flange 26.

Figure 8B:
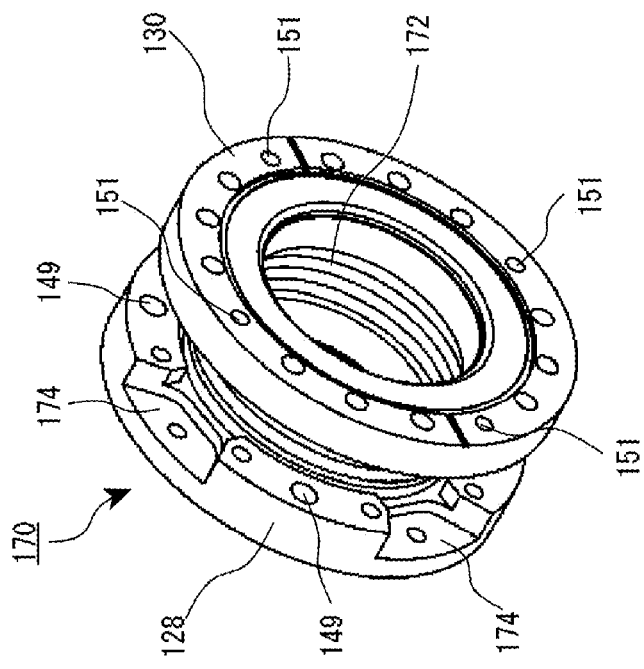
FIGS. 8A and 8B are a schematic side view and a perspective view which illustrate a flange body according to another embodiment.
Figure 8A:
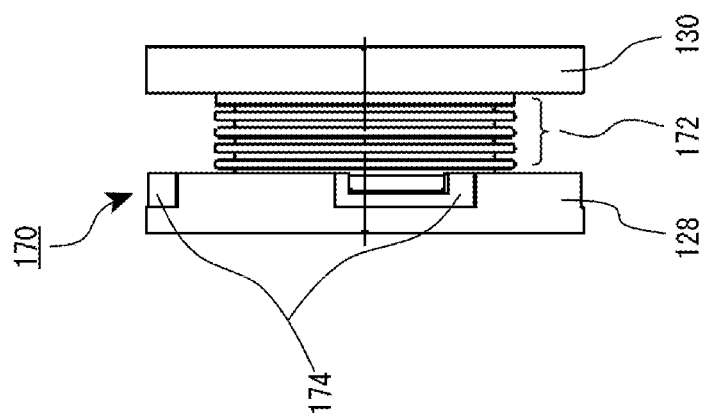

FIGS. 8A and 8B are a schematic side view and a perspective view which illustrate a flange body 170 according to another embodiment. The flange body 170 includes the first flange 128, the second flange 130, and a bellows 172. The bellows 172 serving as a vacuum seal portion connects the first flange 128 to the second flange 130. In this manner, airtightness inside the flange body 170 is maintained. For example, the bellows 172 is a metal vacuum bellows, one end of which is fixed to the first flange 128, and the other end of which is fixed to the second flange 130 by welding or other suitable joining means, for example. As illustrated, a plurality of flange recessed portions 174 are formed at an equal interval in the circumferential direction on a surface of the first flange 128 facing the second flange 130 side.

Figure 9:
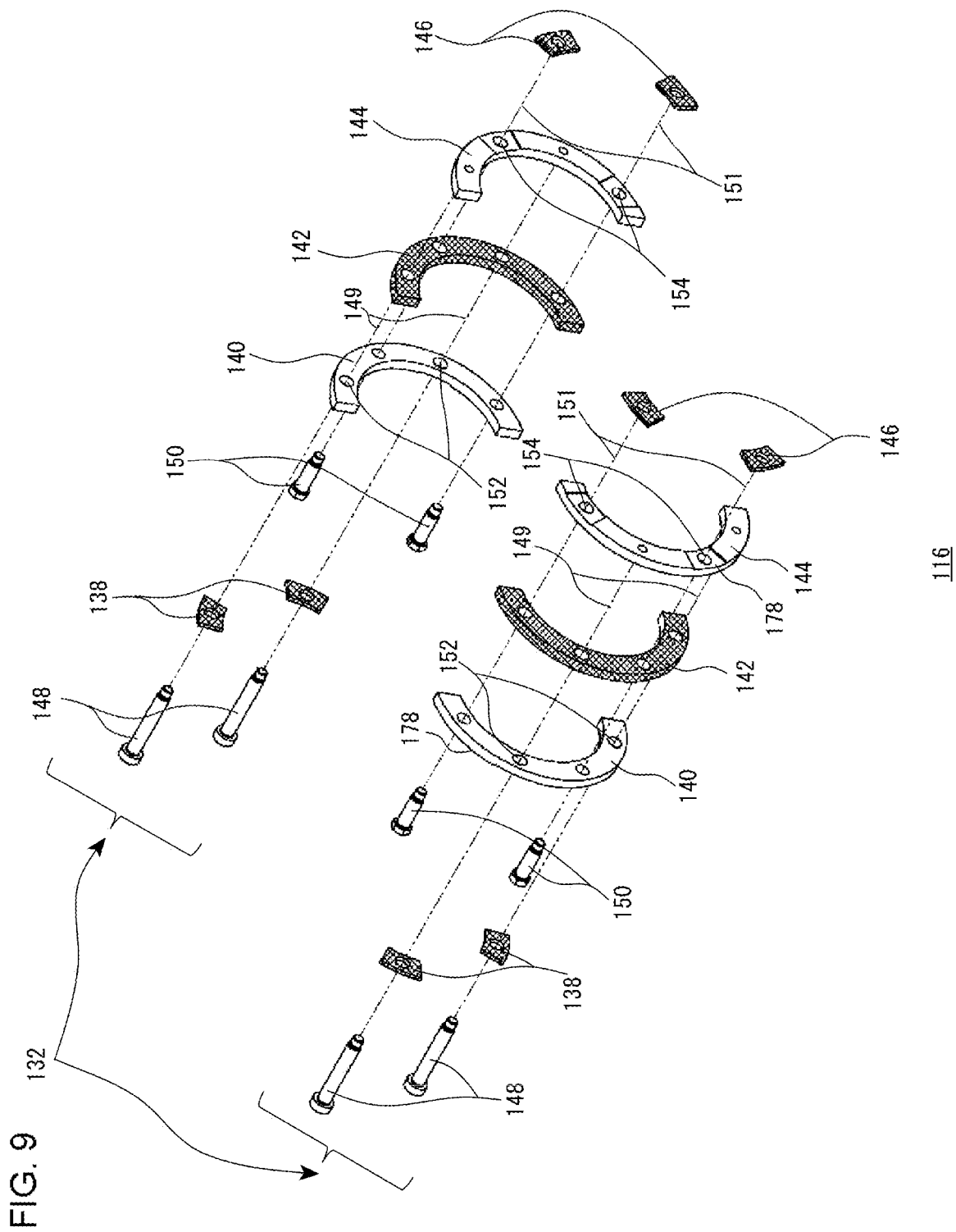
FIG. 9 is an exploded perspective view schematically illustrating a vibration isolation structure according to another embodiment.

FIG. 9 is an exploded perspective view schematically illustrating the laminated vibration isolation body 132 of the vibration isolation structure 116 according to another embodiment. A plurality of the laminated vibration isolation bodies 132 are provided in the vibration isolation structure 116. Therefore, each of the components of the laminated vibration isolation body 132 is also provided as a plurality of parts. A mutual positional relationship and a fixing method between the support member and the vibration isolation material which configure the laminated vibration isolation body 132 are substantially the same as those in the above-described embodiment.

Referring to FIGS. 7 to 9, the description will be continued. A first fastening member 148 fixes the second support member 144 to the first flange 128 to sandwich the first vibration isolation material 138, the first support member 140, and the intermediate vibration isolation material 142 between the first flange 128 and the second support member 144. A second fastening member 150 fixes the first support member 140 to the second flange 130 to sandwich the intermediate vibration isolation material 142, the second support member 144, and the second vibration isolation material 146 between the second flange 130 and the first support member 140.

The first fastening member 148 and a first fastening hole 149 are provided at a plurality of locations (for example, four locations) at an equal angular interval in the circumferential direction. The first fastening hole 149 reaches the second support member 144 by penetrating the first flange 128, the first vibration isolation material 138, the first support member 140, and the intermediate vibration isolation material 142. The first fastening member 148 is inserted into the first fastening hole 149, and the second support member 144 is fastened to the first flange 128 by the first fastening member 148. The first fastening hole 149 is a bolt hole in the second support member 144. A fastening force of the first fastening member 148 acts on the first vibration isolation material 138, the first support member 140, and the intermediate vibration isolation material 142 which are pinched between the first flange 128 and the second support member 144.

The first fastening member 148 is disposed in non-contact with the first support member 140. The first support member 140 has a first insertion hole 152 having the diameter larger than that of the first fastening member 148. Therefore, a vibration transmission channel is not formed between the first fastening member 148 and the first support member 140. In addition, the first fastening member 148 is disposed in non-contact with the second flange 130. The second vibration isolation material 146 is inserted between the second flange 130 and the second support member 144, and a tip part of the first fastening member 148 does not reach the second flange 130.

The second fastening member 150 and a second fastening hole 151 are provided at a plurality of locations (for example, four locations) at an equal angular interval in the circumferential direction. The second fastening hole 151 reaches the second flange 130 by penetrating the first support member 140, the intermediate vibration isolation material 142, the second support member 144, and the second vibration isolation material 146. The second fastening member 150 is inserted into the second fastening hole 151, and the second flange 130 is fastened to the first support member 140 by the second fastening member 150. The second fastening hole 151 is a bolt hole in the second flange 130. A fastening force of the second fastening member 150 acts on the intermediate vibration isolation material 142, the second support member 144, and the second vibration isolation material 146 which are pinched between the second flange 130 and the first support member 140.

The second fastening member 150 is disposed in non-contact with the second support member 144. The second support member 144 has a second insertion hole 154 having the diameter larger than that of the second fastening member 150. Therefore, a vibration transmission channel is not formed between the second fastening member 150 and the second support member 144. In addition, the second fastening member 150 is disposed in non-contact with the first flange 128. A head portion of the second fastening member 150 is accommodated in the flange recessed portion 174 formed in the first flange 128, and the second fastening member 150 does not come into contact with the first flange 128.

The first support member 140 is a semicircular arc plate, and is formed of a metal material or other suitable materials. The two first support members 140 are aligned with each other. In this manner, it is considered that one annular support member is formed. The same applies to the second support member 144. Similarly, the intermediate vibration isolation material 142 is formed in a semicircular arc shape. Similarly, the two intermediate vibration isolation materials 142 are aligned with each other. In this manner, it is considered that one annular vibration isolation material is formed.

In order to ensure intensity against both the fastening forces of the first fastening member 148 and the second fastening member 150, the intermediate vibration isolation material 142 is thicker than the first vibration isolation material 138 in the center axis direction of the laminated vibration isolation body 132. Similarly, the intermediate vibration isolation material 142 is thicker than the second vibration isolation material 146 in the center axis direction of the laminated vibration isolation body 132.

In addition, four first vibration isolation materials 138 and four second vibration isolation materials 146 are provided. The four first vibration isolation materials 138 can be disposed along one annular support member formed of the first support members 140 by aligning the four first vibration isolation materials 138 at an interval in the circumferential direction. Therefore, it is considered that one annular vibration isolation material is formed by the four first vibration isolation materials 138. Similarly, the four second vibration isolation materials 146 can be disposed along one annular support member formed of the second support member 144 by aligning the four second vibration isolation materials 146 at an interval in the circumferential direction. In order to facilitate positioning of the vibration isolation material on the support member, a recessed portion 178 formed to be aligned with a size of the vibration isolation material may be provided in the support member.

The first support member 140, the intermediate vibration isolation material 142, and the second support member 144 are laminated in this order. The two first vibration isolation materials 138 are placed on one side thereof, and the two second vibration isolation materials 146 are placed on a side opposite thereto. In this case, the semicircular arc laminated vibration isolation body 132 is formed. It is considered that one annular laminated vibration isolation body is formed by aligning the two laminated vibration isolation bodies 132.

The number of divisions of each component of the laminated vibration isolation body 132 is not limited to the above-described example, and may be smaller than that in the example, or may be larger than that in the example.

Figure 10A:
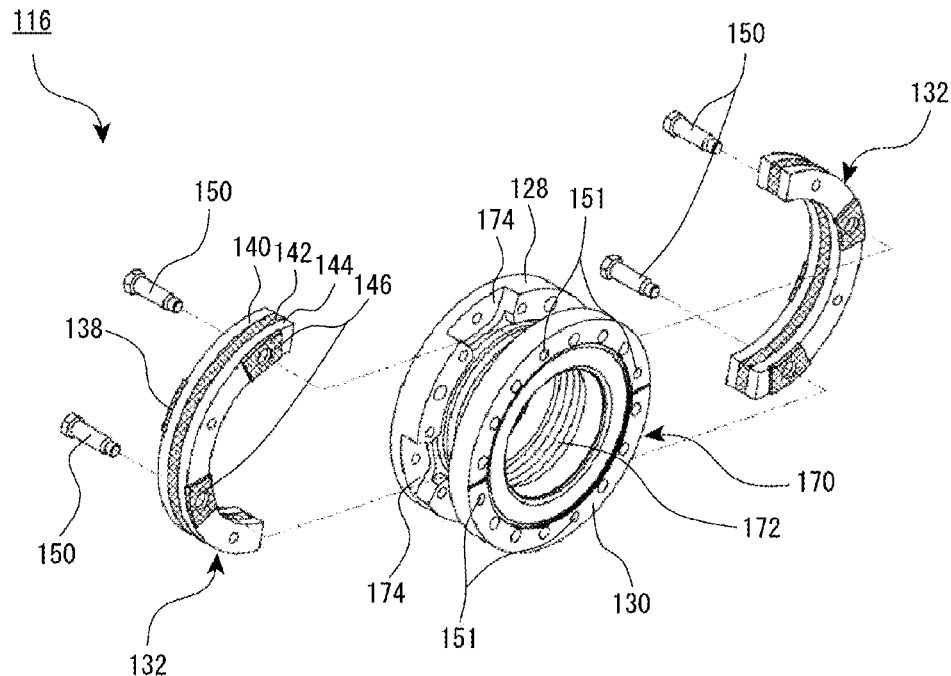
FIGS. 10A and 10B are views for describing an example of an assembly procedure of the vibration isolation structure.
Figure 10B:
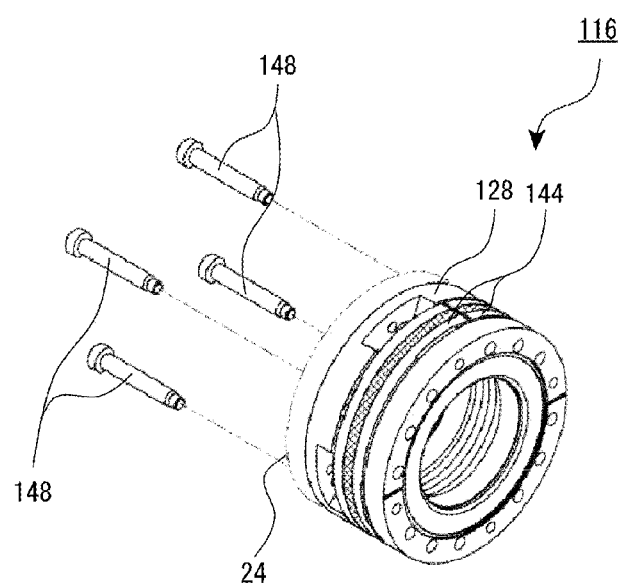

FIGS. 10A and 10B are views for describing an example of an assembly procedure of the vibration isolation structure 116. Although omitted to easily view FIG. 10A, the second flange 130 may be attached to the cryocooler flange 26 in advance by a bolt.

As illustrated in FIG. 10A, the laminated vibration isolation body 132 is formed by laminating the first vibration isolation material 138, the first support member 140, the intermediate vibration isolation material 142, the second support member 144, and the second vibration isolation material 146 in this order to align the positions of the through-holes of the members. The second fastening member 150 is inserted into the second fastening hole 151. The laminated vibration isolation body 132 is assembled between the first flange 128 and the second flange 130 so that the second fastening hole 151 is aligned with the flange recessed portion 174 of the first flange 128. The first support member 140 is fastened to the second flange 130 by the second fastening member 150.

The laminated vibration isolation body 132 is disposed outside the bellows 172 serving as the vacuum seal portion in the radial direction. The laminated vibration isolation body 132 is disposed outside the vacuum environment, that is, in the ambient environment to surround the flange body 170.

Next, as illustrated in FIG. 10B, the second support member 144 is fastened to the first flange 128 by the first fastening member 148. In this case, the first fastening member 148 may fasten the vacuum chamber flange 24 and the first flange 128 to each other. Then, the vacuum chamber flange 24 and the first flange 128 are firmly fixed to each other by an additional bolt. In this way, as illustrated in FIG. 7, the vibration isolation structure 116 is assembled.

In this way, the first support member 140 is pinched between the first vibration isolation material 138 and the intermediate vibration isolation material 142, and is disposed in non-contact with the first flange 128, the second support member 144, and the first fastening member 148. The second support member 144 is pinched between the second vibration isolation material 146 and the intermediate vibration isolation material 142, and is disposed in non-contact with the second flange 130, the first support member 140, and the second fastening member 150. In addition, as described above, the first flange 128 and the second flange 130 are connected to each other by the bellows 172.

Therefore, the vibration isolation structure 116 includes the first support structure having the first flange 128, the second support member 144, and the first fastening member 148, and the second support structure having the second flange 130, the first support member 140, and the second fastening member 150. The first support structure supports the first vibration isolation material 138 and the intermediate vibration isolation material 142, and the second support structure supports the intermediate vibration isolation material 142 and the second vibration isolation material 146. The first support structure and the second support structure are vibration-isolated from each other by the first vibration isolation material 138, the intermediate vibration isolation material 142, and the second vibration isolation material 146. The first support structure is fixed to the cryopump vacuum chamber 12, and the second support structure is fixed to the cryocooler 14. Therefore, the cryopump vacuum chamber 12 is vibration-isolated from the cryocooler 14, and the vibrations transmitted from the cryocooler 14 to other devices such as the vacuum process device can be reduced.

The bellows 172 may be deformed to some extent due to the weight of the cryopump vacuum chamber 12 and the cryocooler 14. The bellows 172 is slightly bent so that one of the first flange 128 and the second flange 130 is slightly inclined with respect to the other. As a result, the first fastening member 148 may have a contact point with the first support member 140 in at least one first insertion hole 152. Similarly, the second fastening member 150 may come into contact with the second support member 144 in at least one second insertion hole 154. However, even when any of the fastening members comes into point contact with the support member, the fastening members are not tightly coupled (for example, fastened) to each other and do not form a substantial vibration transmission channel. Therefore, the vibration isolation structure 116 can still provide desired vibration isolation performance.

Figure 11:
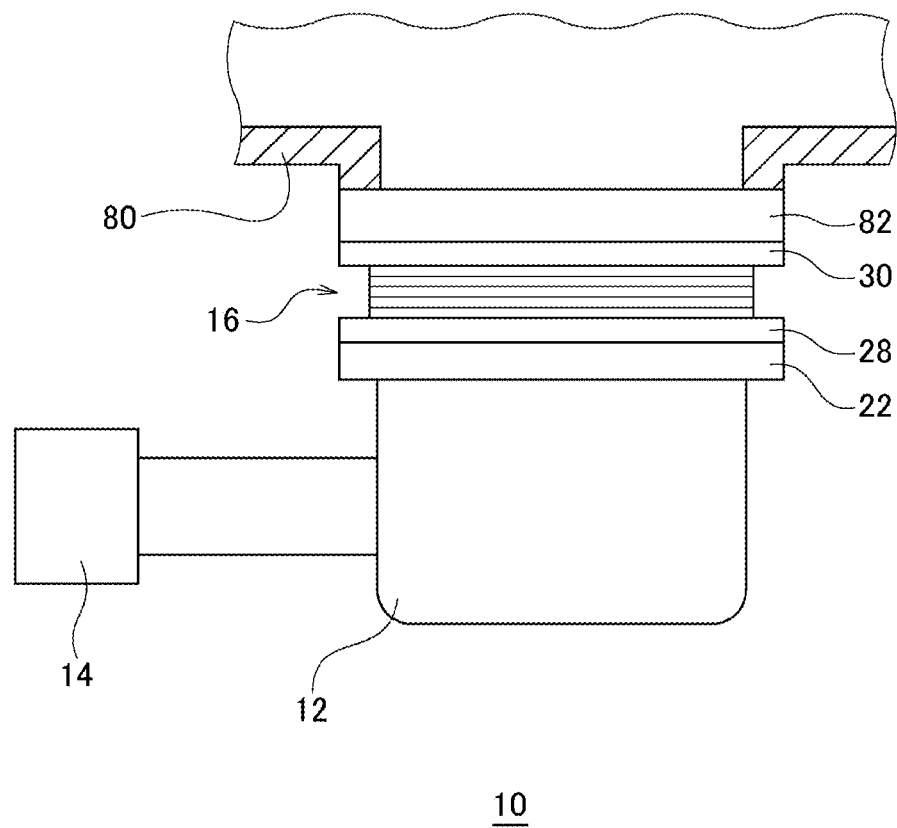
FIG. 11 is a view schematically illustrating a vibration isolation structure according to still another embodiment.

FIG. 11 is a view schematically illustrating the vibration isolation structure 16 according to still another embodiment. Instead of mounting the vibration isolation structure 16 between the cryopump vacuum chamber 12 and the cryocooler 14, the vibration isolation structure 16 may be mounted between the intake port flange 22 and a vacuum chamber 80. Usually, a gate valve 82 is attached between the cryopump 10 and the vacuum chamber 80. Accordingly, the vibration isolation structure 16 may be mounted between the intake port flange 22 and the gate valve 82. For example, the first flange 28 of the vibration isolation structure 16 may be attached to the intake port flange 22, and the second flange 30 may be attached to the gate valve 82 (or vice versa). Alternatively, the vibration isolation structure 16 may be mounted between the gate valve 82 and the vacuum chamber 80.

In addition, as another example, the cryopump vacuum chamber 12 may be divided into the vacuum chamber main body 12*a* and the cryocooler accommodating cylinder 12*b*, and the vibration isolation structure 16 may be mounted between the vacuum chamber main body 12*a* and the cryocooler accommodating cylinder 12*b*.

Figure 12:
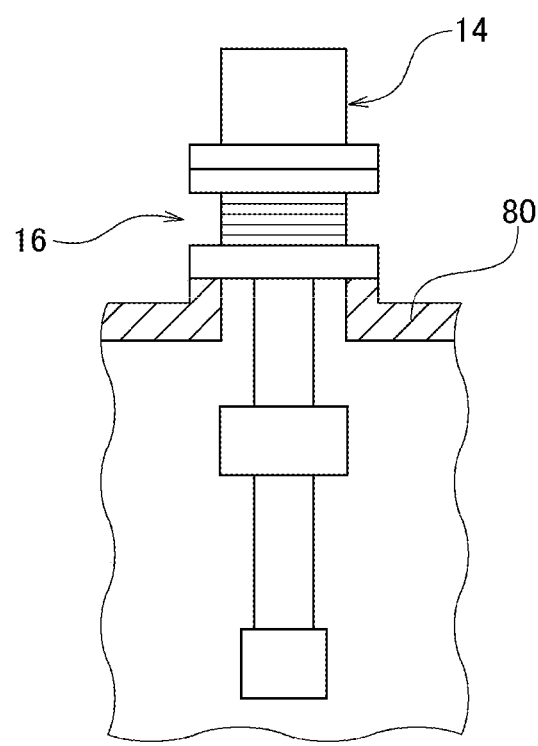
FIG. 12 is a view schematically illustrating a vibration isolation structure according to still another embodiment.

FIG. 12 is a view schematically illustrating the vibration isolation structure 16 according to still another embodiment. Instead of applying the vibration isolation structure 16 to the cryopump 10, the vibration isolation structure 16 may be applied to a single body of the cryocooler 14. Therefore, the vibration isolation structure 16 may be mounted between the cryocooler 14 and the vacuum chamber 80.

Hitherto, the present invention has been described based on the embodiments. The present invention is not limited to the above-described embodiments. It may be understood by those skilled in the art that various design changes can be made, various modification examples can be adopted, and the modification examples also fall within the scope of the present invention. Various features described with reference to a certain embodiment are also applicable to other embodiments. A new embodiment acquired from a combination of the embodiments compatibly achieves each advantageous effect of the combined embodiments.

In the embodiments described above, the individual annular support member is provided as a single ring-shaped plate. However, one annular support member may be divided into a plurality of members for easy manufacturing or for other reasons, for example, when the vibration isolation structure 16 has a large diameter to be applied to the cryopump 10 having a large size. For example, one annular support member may be formed by preparing a plurality of arc members, and annularly coupling the arc members to each other, or annularly aligning the arc members. Similarly, one annular vibration isolation material may be divided into a plurality of members.

In the above-described embodiment, a case where the fastening member is the bolt has been described as an example. However, for example, the fastening member may be a rivet or other fastening members. Alternatively, the annular support member and the flange may be fixed by using any connecting member configured to sandwich the members, such as a clamp. Like the bolt, the fastening member (or the connecting member) may be removable. The removable fastening member is conveniently used when the vibration isolation structure is dissembled or the vibration isolation material is replaced.

In the above-described embodiment, the first flange 28 is mounted on the vacuum chamber flange 24, and is fixed to the cryopump vacuum chamber 12. The second flange 30 is mounted on the cryocooler flange 26, and is fixed to the cryocooler 14. However, this configuration is not essential. For example, the first flange 28 may be formed integrally with the cryopump vacuum chamber 12. The second flange 30 may be formed integrally with the room temperature portion 14*a* of the cryocooler 14.

In the above-described embodiment, the vacuum seal portion 56 is formed between the first flange 28 and the second flange 30, and the first flange 28 and the second flange 30 are airtightly connected to each other. Alternatively, the second flange 30 may be airtightly connected to the first flange 28 via an additional member, such as a bellows, for example.

When required, the annular laminated vibration isolation body 32 may include an additional component (for example, a third annular support member or a third annular vibration isolation material).

The present invention has been described by using specific terms and phrases, based on the embodiments. However, the embodiments show only one aspect of principles and applications of the present invention. The embodiments allow many modification examples or disposition changes within the scope not departing from the idea of the present invention defined in the appended claims.

INDUSTRIAL APPLICABILITY

The present invention can be used in a field of the cryopump and the cryocooler vibration isolation structure.

It should be understood that the invention is not limited to the above-described embodiment, but may be modified into various forms on the basis of the spirit of the invention. Additionally, the modifications are included in the scope of the invention.

What is claimed is:

1. A cryopump comprising:
  a cryopump vacuum chamber;
  a cryocooler;
  a first flange fixed to the cryopump vacuum chamber;
  a second flange fixed to the cryocooler and airtightly connected to the first flange; and
  an annular laminated vibration isolation body in which a first annular vibration isolation material, a first annular support member, an intermediate annular vibration isolation material, a second annular support member, and a second annular vibration isolation material are disposed in this order from the first flange toward the second flange,
  wherein the second annular support member and the first annular support member are fixed to the first flange and the second flange, respectively, such that the first flange and the second annular support member are vibration-isolated from the second flange and the first annular support member.

2. The cryopump according to claim 1, further comprising:
  a first fastening member that fixes the second annular support member to the first flange to sandwich the first annular vibration isolation material, the first annular support member and the intermediate annular vibration isolation material between the first flange and the second annular support member; and
  a second fastening member that fixes the first annular support member to the second flange to sandwich the intermediate annular vibration isolation material, the second annular support member and the second annular vibration isolation material between the second flange and the first annular support member.

3. The cryopump according to claim 2,
  wherein the first fastening member is disposed in non-contact with the first annular support member and the second flange, and the second fastening member is disposed in non-contact with the second annular support member and the first flange.

4. The cryopump according to claim 2,
  wherein the first annular support member includes a first insertion hole having a diameter larger than that of the first fastening member, and
  the second annular support member includes a second insertion hole having a diameter larger than that of the second fastening member.

5. The cryopump according to claim 1,
  wherein the intermediate annular vibration isolation material is thicker than the first annular vibration isolation material in a center axis direction of the annular laminated vibration isolation body.

6. The cryopump according to claim 1,
  wherein a vacuum seal portion is formed between the first flange and the second flange, and
  the annular laminated vibration isolation body is disposed radially outward of the vacuum seal portion.

7. The cryopump according to claim 6,
  wherein the first flange includes a first flange cylinder portion, the second flange includes a second flange cylinder portion, and one of the first flange cylinder portion and the second flange cylinder portion is inserted into the other, and
  the vacuum seal portion includes a seal member disposed between the first flange cylinder portion and the second flange cylinder portion.

8. The cryopump according to claim 6, further comprising:
  a bellows serving as the vacuum seal portion, wherein the first flange and the second flange are connected by the bellows.

9. The cryopump according to claim 1,
  wherein the annular laminated vibration isolation body includes a plurality of portions that are annularly coupled to each other or annularly aligned with each other to form the annular laminated vibration isolation body.

10. A cryocooler vibration isolation structure comprising:
  a first flange;
  a second flange airtightly connected to the first flange; and
  an annular laminated vibration isolation body in which a first annular vibration isolation material, a first annular support member, an intermediate annular vibration isolation material, a second annular support member, and a second annular vibration isolation material are disposed in this order from the first flange toward the second flange, wherein the second annular support member and the first annular support member are fixed to the first flange and the second flange, respectively, such that the first flange and the second annular support member are vibration-isolated from the second flange and the first annular support member.

11. The cryocooler vibration isolation structure according to claim 10, further comprising:
a first fastening member that fixes the second annular support member to the first flange to sandwich the first annular vibration isolation material, the first annular support member and the intermediate annular vibration isolation material between the first flange and the second annular support member; and
a second fastening member that fixes the first annular support member to the second flange to sandwich the intermediate annular vibration isolation material, the second annular support member and the second annular vibration isolation material between the second flange and the first annular support member.

12. The cryocooler vibration isolation structure according to claim 11,
wherein the first fastening member is disposed in non-contact with the first annular support member and the second flange, and
the second fastening member is disposed in non-contact with the second annular support member and the first flange.

13. A cryocooler vibration isolation structure comprising:
a first flange;
a second flange airtightly connected to the first flange;
a laminated vibration isolation body in which a first vibration isolation material, a first support member, an intermediate vibration isolation material, a second support member, and a second vibration isolation material are disposed in this order from the first flange toward the second flange;
a first fixing member that fixes the second support member to the first flange, the first fixing member forming a first support structure for supporting the first vibration isolation material and the intermediate vibration isolation material, together with the first flange and the second support member; and
a second fixing member that fixes the first support member to the second flange, the second fixing member forming a second support structure for supporting the intermediate vibration isolation material and the second vibration isolation material, together with the second flange and the first support member,
wherein the first support structure and the second support structure are vibration-isolated from each other by the first vibration isolation material, the intermediate vibration isolation material and the second vibration isolation material.

14. The cryocooler vibration isolation structure according to claim 13, wherein the first fixing member is disposed in non-contact with the first support member and the second flange, and
the second fixing member is disposed in non-contact with the second support member and the first flange.

15. The cryocooler vibration isolation structure according to claim 13,
wherein the first fixing member includes a first fastening member that fixes the second support member to the first flange to sandwich the first vibration isolation material, the first support member and the intermediate vibration isolation material between the first flange and the second annular support member, and
the second fixing member includes a second fastening member that fixes the first annular support member to the second flange to sandwich the intermediate annular vibration isolation material, the second annular support member and the second annular vibration isolation material between the second flange and the first annular support member.

16. The cryocooler vibration isolation structure according to claim 13,
wherein a vacuum seal portion is formed between the first flange and the second flange, and
the laminated vibration isolation body is disposed radially outward of the vacuum seal portion.

17. The cryocooler vibration isolation structure according to claim 16,
wherein the first flange includes a first flange cylinder portion, the second flange includes a second flange cylinder portion, and one of the first flange cylinder portion and the second flange cylinder portion is inserted into the other, and
the vacuum seal portion includes a seal member disposed between the first flange cylinder portion and the second flange cylinder portion.

18. The cryocooler vibration isolation structure according to claim 16, further comprising:
a bellows serving as the vacuum seal portion, wherein the first flange and the second flange are connected by the bellows.

19. The cryocooler vibration isolation structure according to claim 13,
wherein a plurality of the laminated vibration isolation bodies are annularly coupled to each other or annularly aligned with each other.

20. A cryopump comprising:
the cryocooler vibration isolation structure according to claim 13;
a cryopump vacuum chamber; and
a cryocooler,
wherein the first flange is fixed to the cryopump vacuum chamber, and the second flange is fixed to the cryocooler.

* * * * *